(12) United States Patent
Chiang

(10) Patent No.: US 11,675,387 B2
(45) Date of Patent: Jun. 13, 2023

(54) SHELTER AND SHELTERING APPARATUS

(71) Applicant: BENQ CORPORATION, Taipei (TW)

(72) Inventor: Chin-Fu Chiang, New Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/700,546

(22) Filed: Mar. 22, 2022

(65) Prior Publication Data
US 2023/0011270 A1    Jan. 12, 2023

(30) Foreign Application Priority Data

Jul. 9, 2021   (TW) .................................. 110125223

(51) Int. Cl.
*G06F 1/16*        (2006.01)
(52) U.S. Cl.
CPC ................................ *G06F 1/1603* (2013.01)
(58) Field of Classification Search
CPC .... G06F 1/1603; G06F 1/1647; G06F 1/1649; G06F 1/1692; G06F 1/1601; F16M 11/08
See application file for complete search history.

(56) References Cited

U.S. PATENT DOCUMENTS

2014/0375901 A1* 12/2014 Stockett ................... H04N 5/64
348/838

OTHER PUBLICATIONS

Photodon, Photodon's Largest & Smallest Monitor Hoods, Feb. 3, 2015, URL: https://www.youtube.com/watch?v=hDReg1A28zk, XP055964794, Youtube.

* cited by examiner

*Primary Examiner* — Anthony Q Edwards
*Assistant Examiner* — Bryan Van Huynh

(57) ABSTRACT

A shelter and a sheltering apparatus of adjusting an assembly angle are applied for an assembling display apparatus with a first display and a second display. The shelter includes a bridging component, a first top member and a second top member. The bridging component includes a first lateral member and a second lateral member. The first lateral member is detachably connected to the first display. The second lateral member is rotatably assembled with the first lateral member and detachably connected to the second display. The first top member is disposed on an upper end of the first lateral member. The second top member is disposed on an upper end of second lateral member, and partly overlapped with the first top member in a variable manner for matching relative rotation between the first lateral member and the second lateral member.

19 Claims, 9 Drawing Sheets

SHELTER AND SHELTERING APPARATUS

BACKGROUND OF THE INVENTION

1. Field of the Invention

The present invention relates to a shelter and a related sheltering apparatus, and more particularly, to a shelter of adjusting an assembly angle for a variety of display assembly and a related sheltering apparatus.

2. Description of the Prior Art

With the advanced technology, an entertainment apparatus is continuously evolved to provide preferred user experience. As an example of the gaming display, software and hardware of the gaming display can design several functions of high contrast, high sharpness and automatic illumination adjustment in accordance with variation of environmental illumination. However, even if the screen intensity of the gaming display can be automatically adjusted, an image efficiency of the gaming display is still affected by the environmental illumination and results in low image quality. A conventional solution may dispose a shelter above the display to block projection of external light; if the entertainment apparatus includes several displays assembled with each other, the conventional shelter has to be particularly designed to match an angle between the displays of the entertainment apparatus; the conventional shelter does not have the angle adjusting function, which means the conventional shelter is only matched with the one-type entertainment apparatus (having a specific number of the displays and a specific angle between the displays), but cannot be applied for other-type entertainment apparatus (having the different number of displays and the different angle between the displays)). Thus, design of a shelter capable of freely adjusting an assembly angle for matching with a variety of display assembly is an important issue in the mechanical design industry.

SUMMARY OF THE INVENTION

The present invention provides a shelter of adjusting an assembly angle for a variety of display assembly and a related sheltering apparatus for solving above drawbacks.

According to the claimed invention, a shelter of adjusting an assembly angle is applied for a display screen with a first display and a second display. The shelter includes a bridging component, a first top member and a second top member. The bridging component includes a first lateral member and a second lateral member. The first lateral member is detachably connected to the first display. The second lateral member is rotatably assembled with the first lateral member and detachably connected to the second display. The first top member is disposed on an upper end of the first lateral member. The second top member is disposed on an upper end of the second lateral member, and partly overlapped with the first top member for matching relative rotation between the first lateral member and the second lateral member.

According to the claimed invention, the second top member is a stage-type structure having a first region and a second region, the second top member is overlapped with the first top member via the first region, and the second region aligns with the first top member.

According to the claimed invention, the first lateral member includes at least one first engaging portion, and the second lateral member includes at least one second engaging portion. The first engaging portion is movably engaged with the second engaging portion to allow the relative rotation between the first lateral member and the second lateral member.

According to the claimed invention, when the first engaging portion is engaged with the second engaging portion, the first engaging portion is spaced from the second engaging portion in a predefined distance, so that the first lateral member is able to rotate and shift relative to the second lateral member.

According to the claimed invention, the first engaging portion includes a pin, and the second engaging portion includes an axle hole. The pin is rotatably inserted into the axle hole to engage the first engaging portion with the second engaging portion.

According to the claimed invention, the first engaging portion includes a first piercing hole, and the second engaging portion includes a second piercing hole. The bridging component further includes a shaft member, and the shaft member passes through the first piercing hole and the second piercing hole to engage the first engaging portion with the second engaging portion.

According to the claimed invention, the first lateral member further includes a first light shading portion disposed on an outer surface of the first lateral member facing toward the second lateral member, the first light shading portion is adjacent to the first engaging portion, and a height of the first light shading portion is equal to or smaller than a height of the first engaging portion.

According to the claimed invention, the second lateral member further includes a second light shading portion disposed on an outer surface of the second lateral member facing toward the first lateral member, the second light shading portion is adjacent to the second engaging portion, and a height of the second light shading portion is equal to or smaller than a height of the second engaging portion.

According to the claimed invention, the first top member includes a first contacting portion disposed on an outer edge of the first top member, and further adjacent to the first engaging portion of the first lateral member.

According to the claimed invention, a sheltering apparatus of adjusting an assembly angle includes a first display, a first masking component, a second display, a second masking component and a shelter. The first masking component is disposed on a side of the first display. The second masking component is disposed on a side of the second display opposite to the first display. The shelter is disposed between the first display and the second display. The shelter includes a bridging component, a first top member and a second top member. The bridging component includes a first lateral member and a second lateral member. The first lateral member is detachably connected to the first display. The second lateral member is rotatably assembled with the first lateral member and detachably connected to the second display. The first top member is disposed on an upper end of the first lateral member and connected to the first masking component. The second top member is disposed on an upper end of the second lateral member and connected to the second masking component, and partly overlapped with the first top member for matching relative rotation between the first lateral member and the second lateral member.

The shelter, the sheltering device and the sheltering apparatus of the present invention can utilize the first top member and the second top member to respectively shelter parts of the upper side of the two adjacent displays, and then connect the bridging component between the first top member and the second top member. The bridging component can have the first lateral member and the second lateral member freely assembled with each other in the rotatable manner, and the first lateral member and the second lateral member are respectively connected to the first top member and the second top member, so that the first lateral member and the second lateral member of the bridging component can be automatically unfolded or folded when the assembly angle between the two adjacent displays of the display screen is varied; the rotation angle between the two lateral members can be immediately and synchronously changed in accordance with variation of the assembly angle between the two adjacent displays. The shelter of the present invention can be matched with the multi-display assembly having the plural displays number included at any assembly angle, so that the sheltering device and the sheltering apparatus can be easily changed the assembly angle between the displays in response to the user's demand.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
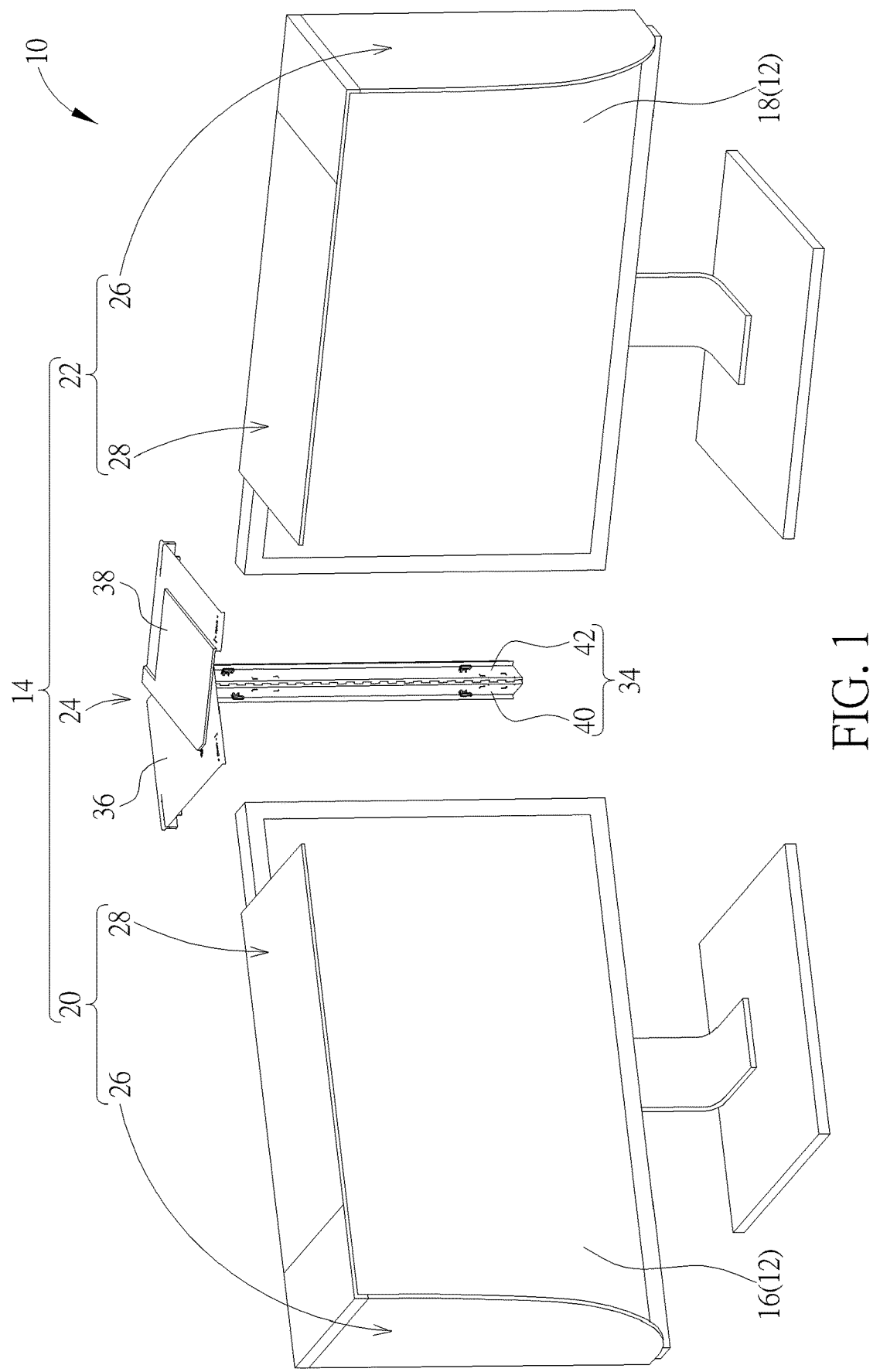
FIG. 1 is a functional block diagram of a sheltering apparatus according to an embodiment of the present invention.
Figure 2:
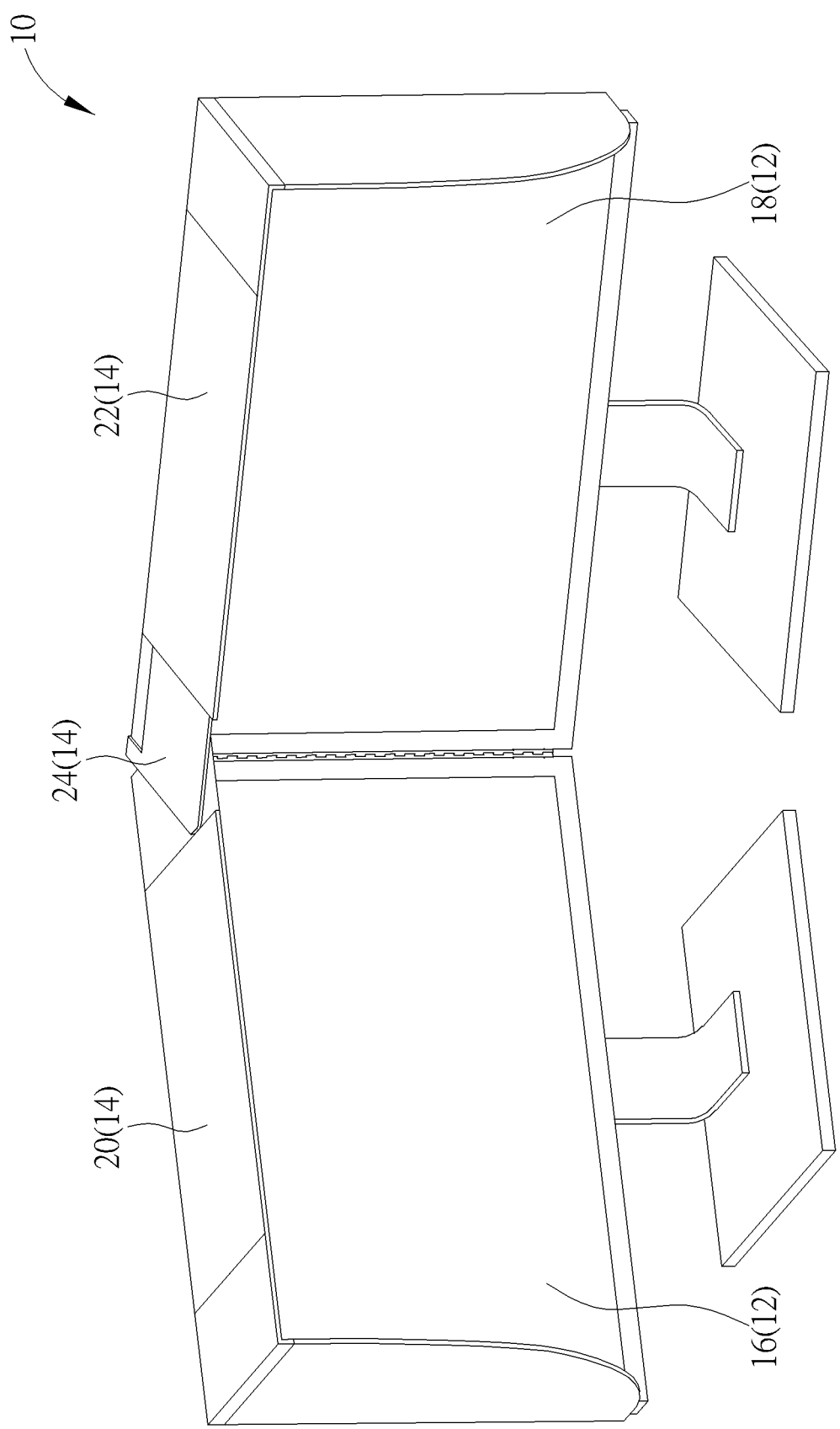
FIG. 2 is an assembly diagram of the sheltering apparatus according to the embodiment of the present invention.

Please refer to FIG. 1 and FIG. 2. FIG. 1 is a functional block diagram of a sheltering apparatus 10 according to an embodiment of the present invention. FIG. 2 is an assembly diagram of the sheltering apparatus 10 according to the embodiment of the present invention. The sheltering apparatus 10 can include a display screen 12 and a sheltering device 14. The display screen 12 can be multi-display assembly having several displays detachably assembled with each other. In the embodiment shown in FIG. 1, the display screen 12 can include a first display 16 and a second display 18 assembled with each other via the sheltering device 14; a number of the display is not limited to the above-mentioned embodiment, and depends on an actual demand. The plural displays of the display screen 12 can be assembled in any assembly angle, and the sheltering device 14 can be adaptively adjusted in accordance with the assembly angle between the plural displays of the display screen 12.

The sheltering device 14 can include a first masking component 20, a second masking component 22 and a shelter 24. The first masking component 20 can be disposed on a left side of the first display 16, and the second masking component 22 can be disposed on a right side of the second display 18 opposite to the first display 16. The first masking component 20 and the second masking component 22 may be normal shelters, and respectively include a lateral masking area 26 and an upper masking area 28. The lateral masking area 26 can be disposed on a lateral side of the display screen 12. The upper masking area 28 can be connected between the lateral masking area 26 and the shelter 24. The shelter 24 can be disposed between the first display 16 and the second display 18, and further connected with the first masking component 20 and the second masking component 22 to form the sheltering device 14. The sheltering device 14 can completely shelter an upper side, a left side and a right side of the display screen 12, no matter what assembly angle is set between the first display 16 and the second display 18, for effectively preventing an image quality of the display screen 12 from being affected by environmental illumination.

Figure 3:
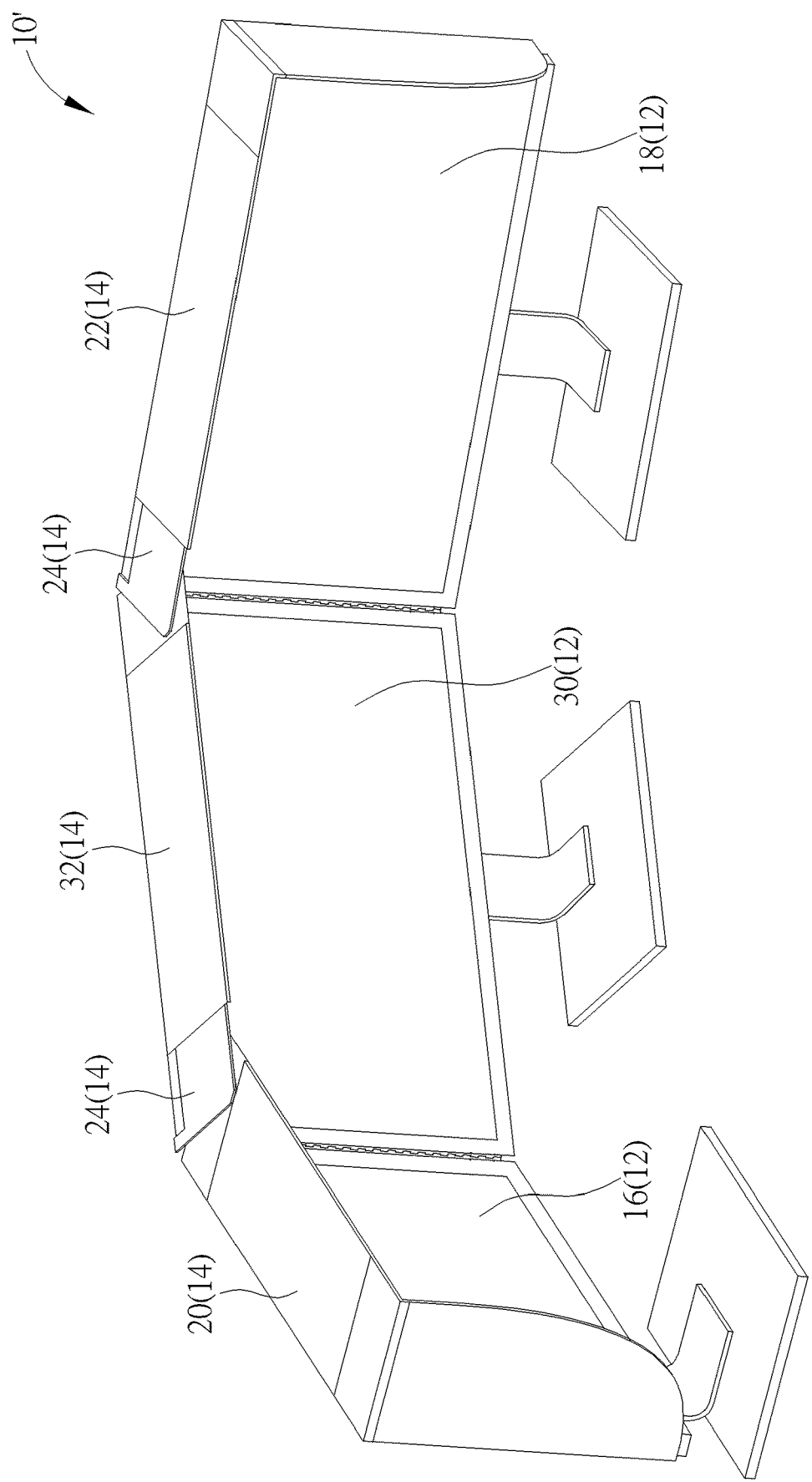
FIG. 3 is an assembly diagram of the sheltering apparatus according to another embodiment of the present invention.

Please refer to FIG. 3. FIG. 3 is an assembly diagram of the sheltering apparatus 10' according to another embodiment of the present invention. In the embodiment, elements having the same numerals as one of the foresaid embodiment have the same structures and functions, and a detailed description is omitted herein for simplicity. The display screen 12 of the sheltering apparatus 10' can include the first display 16, the second display 18 and a third display 30. The third display 30 can be set between the first display 16 and the second display 18. Accordingly, the sheltering device 14 can further include the first masking component 20, the second masking component 22, the shelter 24 and a third masking component 32. The third masking component 32 can be disposed on the third display 30; therefore, the third masking component 32 can be a specific shelter which only has the upper masking area 28.

A number of the shelter 24 can be varied in accordance with a display number of the display screen 12. For example, in the embodiment shown in FIG. 3, the shelters 24 can be disposed between the first display 16 and the third display 30, and further between the second display 18 and the third display 30, so that the sheltering apparatus 10' can have two shelters 24. The shelter 24 of the present invention can completely shelter the upper side, the left side and the right side of the display screen 12 to avoid the image quality of the display screen 12 from being affected by the environmental illumination, even if the display number of the display screen 12 is varied or the assembly angle between the adjacent displays of the display screen 12 is changed.

Figure 4:
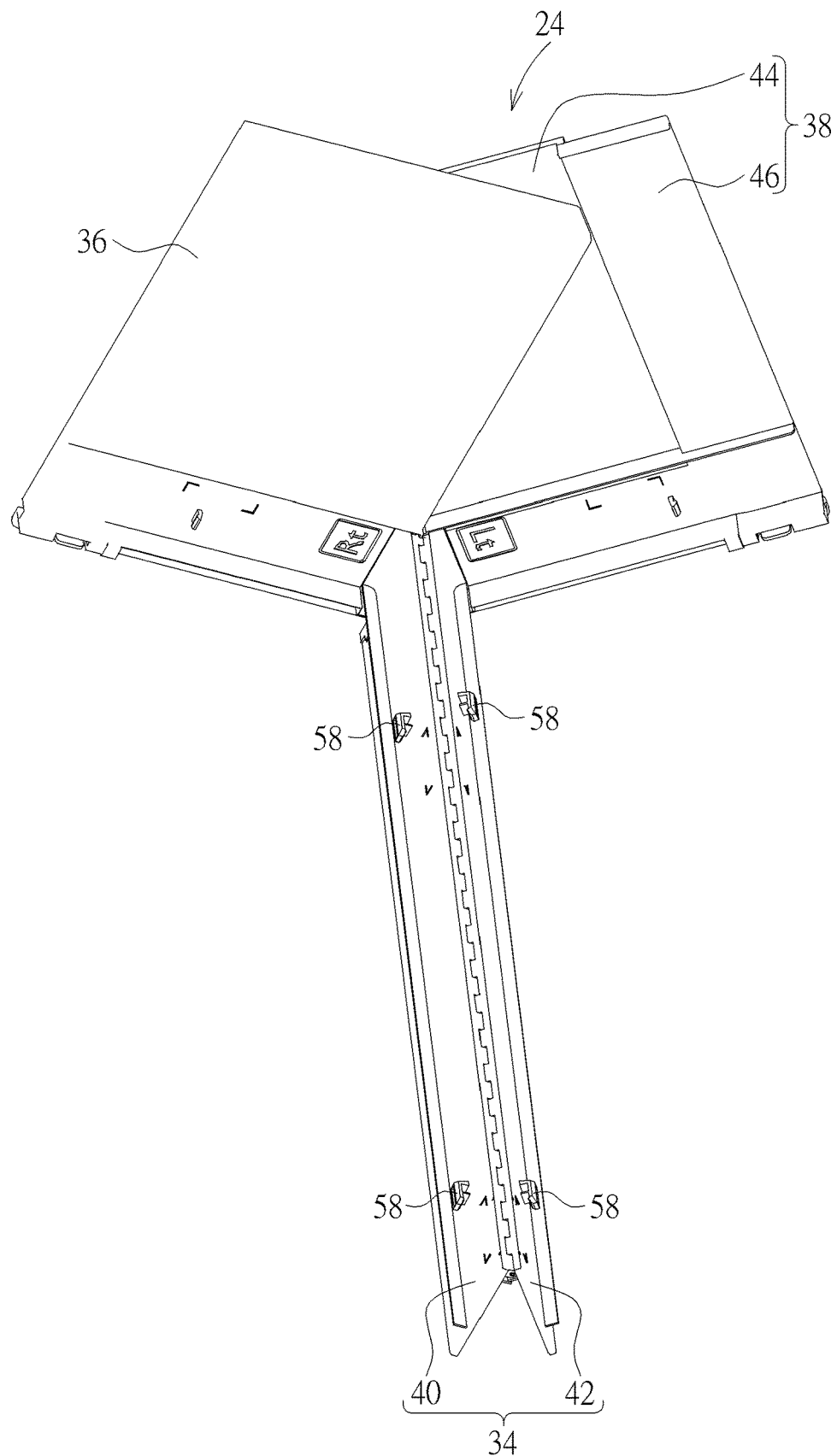
FIG. 4 is a diagram of a shelter according to the embodiment of the present invention.
Figure 5:
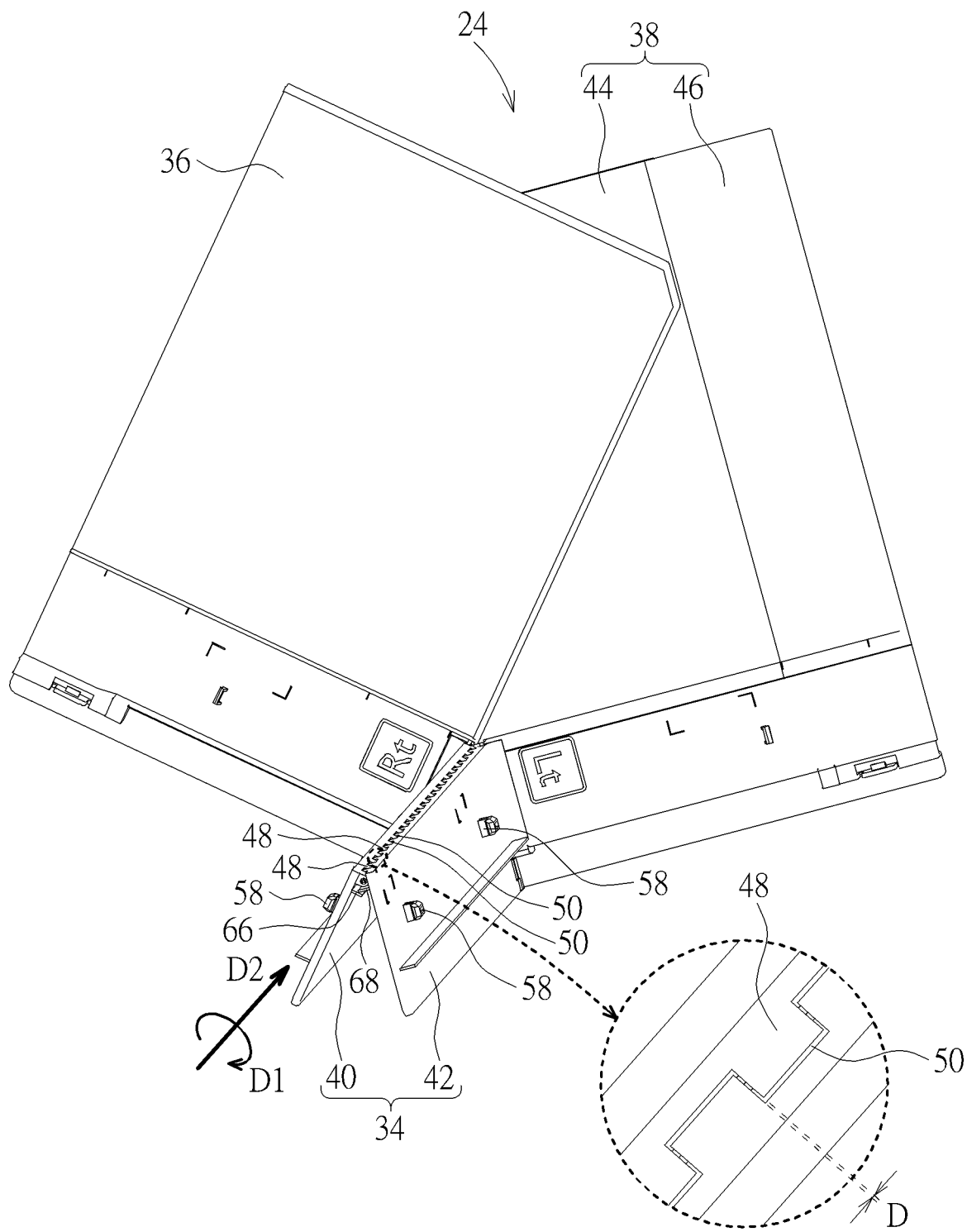
FIG. 5 is a diagram of the shelter in another view according to the embodiment of the present invention.
Figure 6:
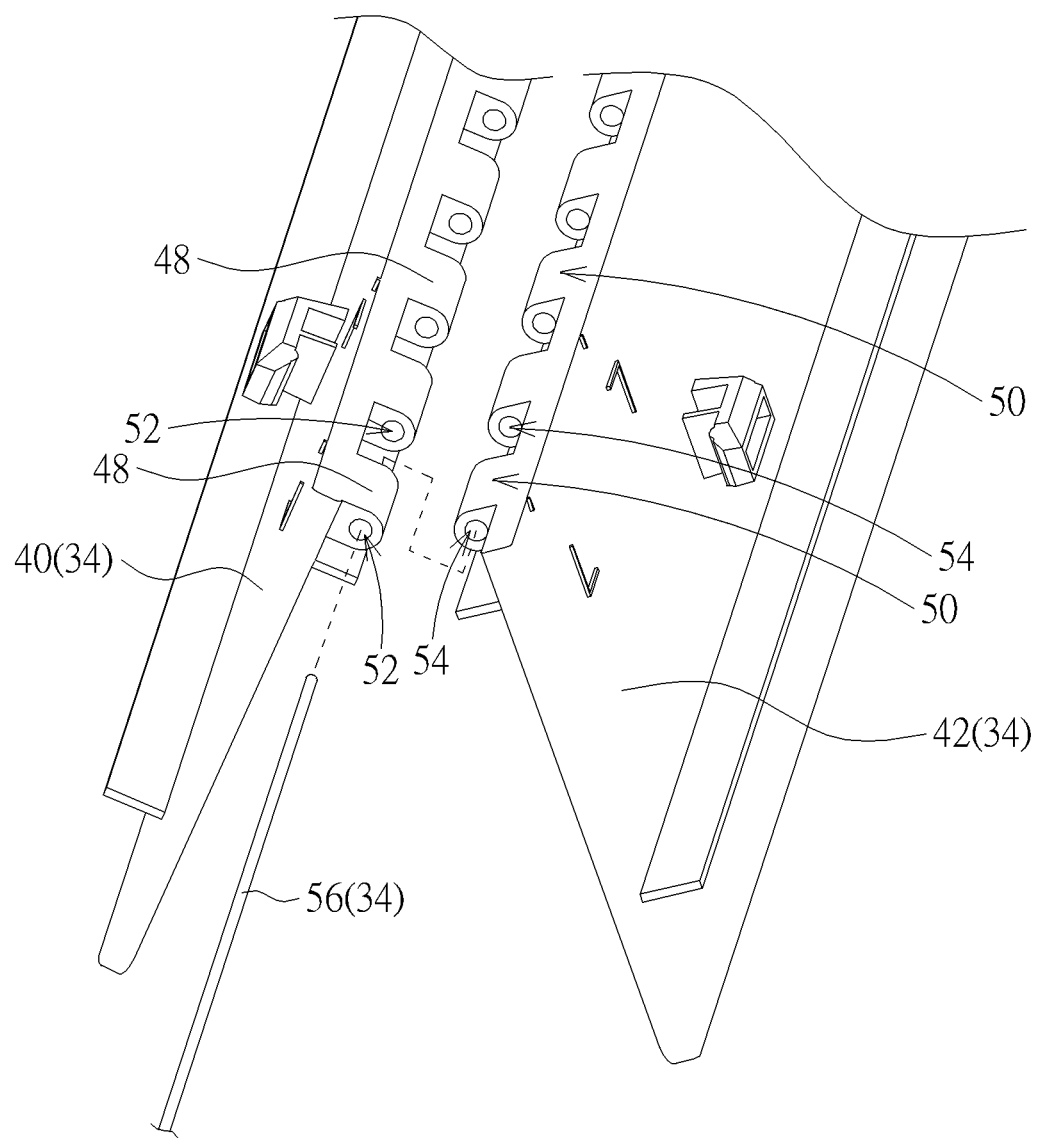
FIG. 6 is a diagram of the shelter according to another embodiment of the present invention.
Figure 7:
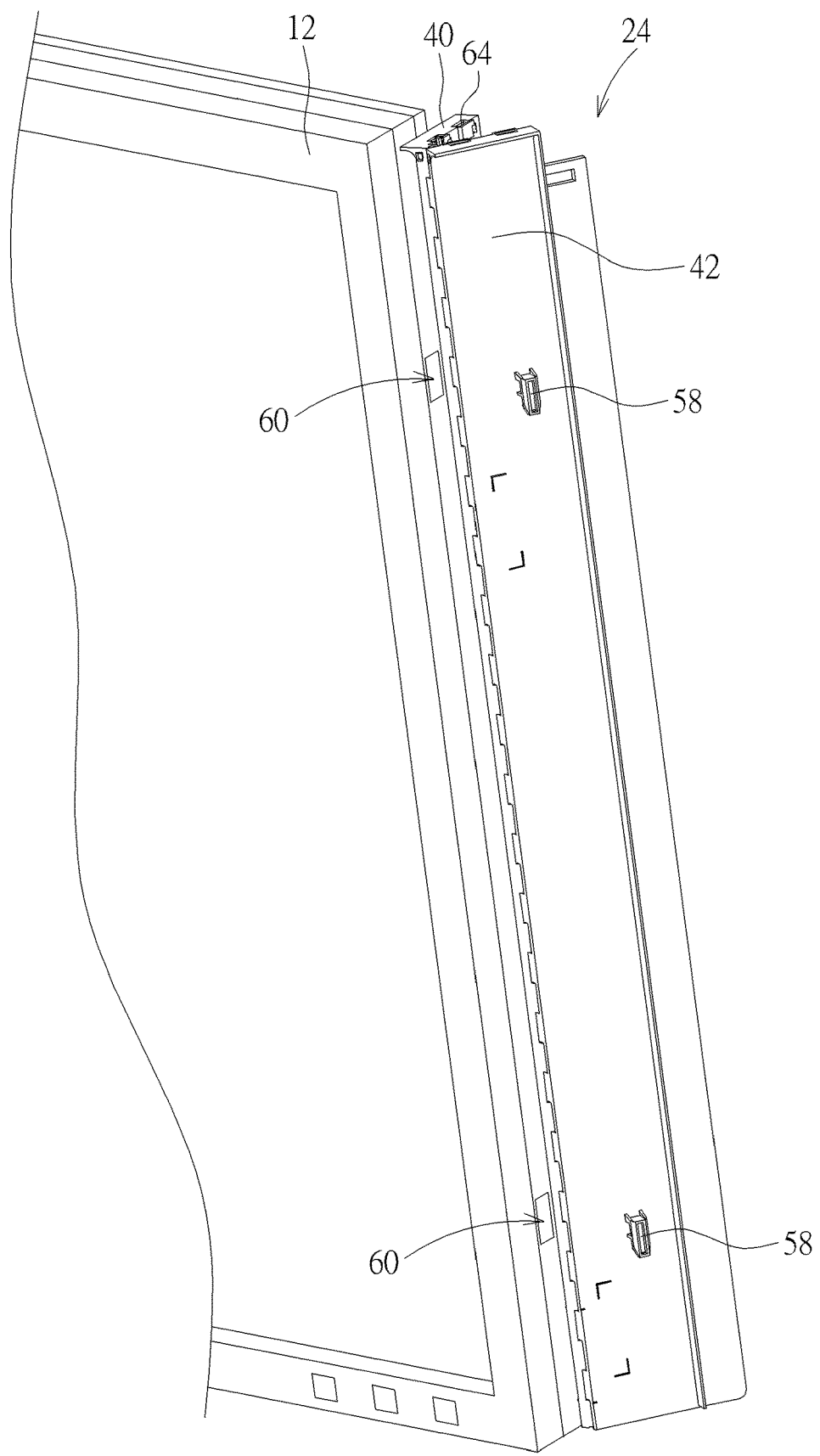
FIG. 7 is an assembly diagram of the shelter and a display screen according to the embodiment of the present invention.
Figure 8:
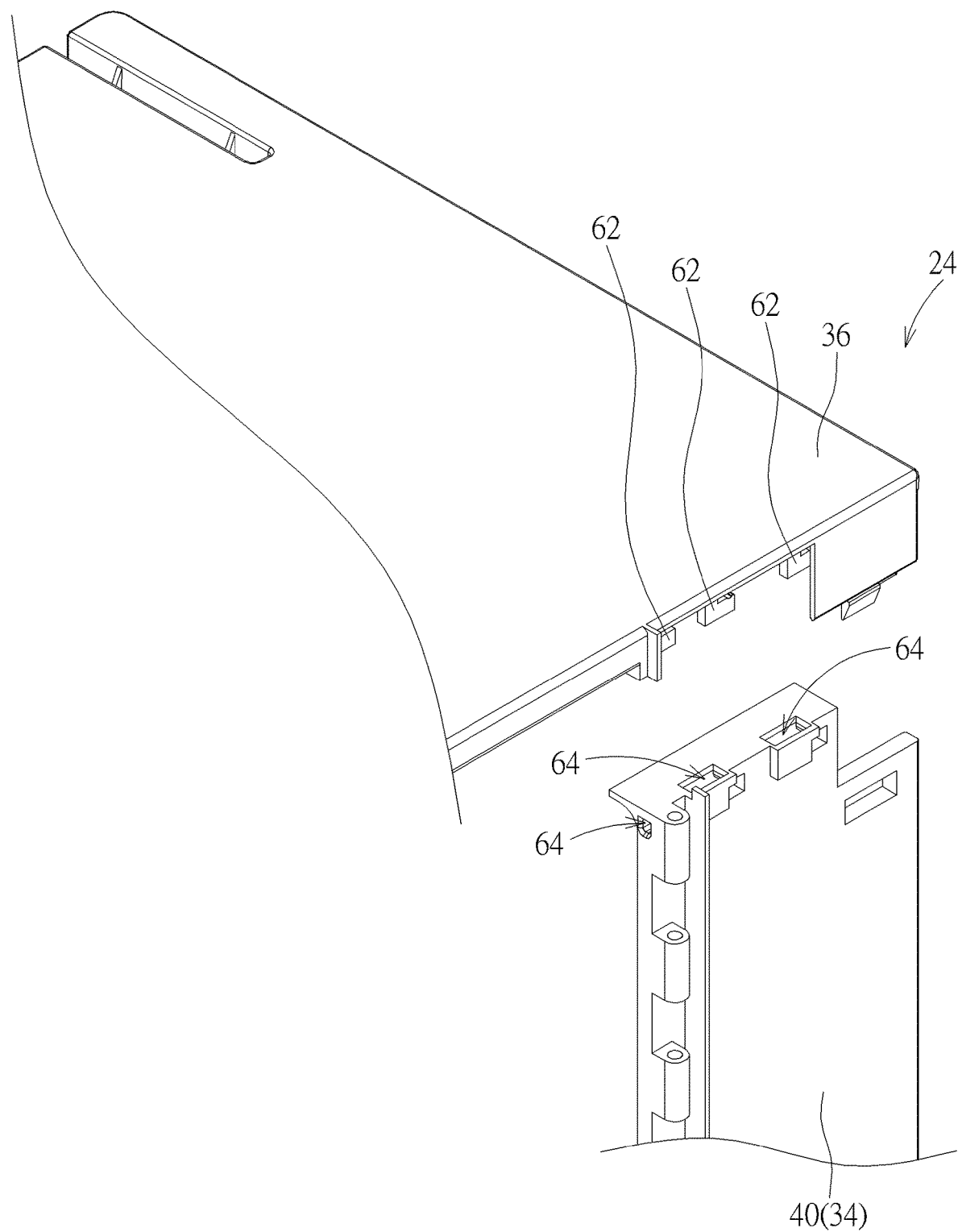
FIG. 8 is a partial exploded diagram of the shelter according to the embodiment of the present invention.
Figure 9:
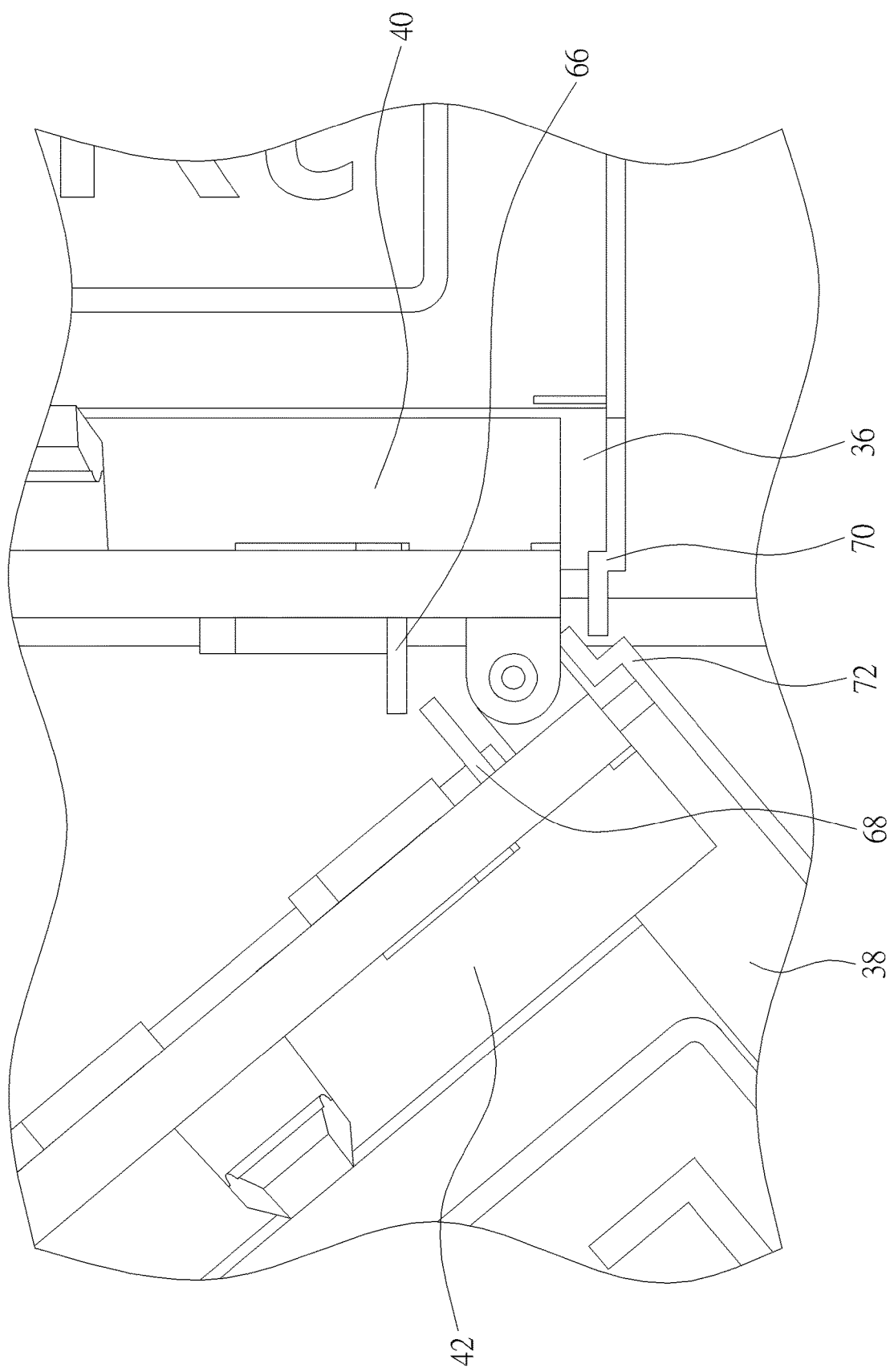
FIG. 9 is a diagram of part of the shelter in another view according to the embodiment of the present invention.

Please refer to FIG. 4 to FIG. 9. FIG. 4 is a diagram of the shelter 24 according to the embodiment of the present invention. FIG. 5 is a diagram of the shelter 24 in another view according to the embodiment of the present invention. FIG. 6 is a diagram of the shelter 24 according to another embodiment of the present invention. FIG. 7 is an assembly diagram of the shelter 24 and the display screen 12 according to the embodiment of the present invention. FIG. 8 is a partial exploded diagram of the shelter 24 according to the embodiment of the present invention. FIG. 9 is a diagram of part of the shelter 24 in another view according to the embodiment of the present invention.

The shelter 24 can include a bridging component 34, a first top member 36 and a second top member 38. The bridging component 34 can be a structural component connected between two adjacent displays of the display screen 12, and can include a first lateral member 40 and a second lateral member 42. As the embodiment shown in FIG. 1 and FIG. 2, the first lateral member 40 and the second lateral member 42 can be assembled with each other in a rotatable manner, and can be respectively connected to the first display 16 and the second display 18 in a detachable manner. The first top member 36 can be disposed on an upper end of the first lateral member 40. The second top member 38 can be disposed on an upper end of the second lateral member 42. Therefore, the first top member 36 and the second top member 38 are fixed to respective components, such as the first lateral member 40 and the second lateral member 42, so that the first top member 36 can be moved close to or distant from the second top member 38 in response to relative rotation between the first lateral member 40 and the second lateral member 42.

In addition, the second top member 38 can be a stage-type structure which includes a first region 44 and a second region 46. The second top member 38 can be overlapped with the first top member 36 via the first region 44, so as to align the second region 46 with the first top member 36, which means the first top member 36 and the second top member 38 can be partly overlapped for matching with the relative rotation between the first lateral member 40 and the second lateral member 42. Shapes of the first region 44 and the second region 46, and dimensional ratio and stage difference between the first region 44 and the second region 46 are not limited to the above-mentioned embodiment, which depend on a design demand, and the detailed description for other possible embodiments is omitted herein for simplicity.

As shown in FIG. 5, the first lateral member 40 can include a plurality of first engaging portions 48, and the second lateral member 42 can include a plurality of second engaging portions 50. The first engaging portion 48 may have a protruding structure, and the second engaging portion 50 may have a corresponding sunken structure; in other possible embodiments, the first engaging portion 48 may have the sunken structure, and the second engaging portion 50 may have the corresponding protruding structure. A shape, a size and connection between the protruding structure and the sunken structure can depend on the design demand. For example, the first engaging portion 48 may set a pin for being the protruding structure, and the second engaging portion 50 may set an axle hole for being the sunken structure. The pin (which means the protruding structure) can be rotatably inserted into the axle hole (which means the sunken structure) to engage the first engaging portion 48 and the second engaging portion 50 in a movable manner, so that the first lateral member 40 can be freely rotated relative to the second lateral member 42.

It should be mentioned that when the first engaging portion 48 is engaged with the second engaging portion 50, the first engaging portion 48 can be spaced from the second engaging portion 50 in a predefined distance D; a width of the first engaging portion 48 can be smaller than a width of the second engaging portion 50, and the first lateral member 40 can be rotated and shifted relative to the second lateral member 42. The foresaid width can represent specific directional dimensions of the first engaging portion 48 and the second engaging portion 50 in its arrangement direction (such as a direction parallel to a long side of the first lateral member 40 and the second lateral member 42). Thus, the first lateral member 40 and the second lateral member 42 can be rotated in a first direction D1 and shifted in a second direction D2 via assembly of the first engaging portion 48 and the second engaging portion 50.

Further, as the embodiment shown in FIG. 6, the first engaging portion 48 can have a first piercing hole 52, and the second engaging portion 50 can have a second piercing hole 54. The bridging component 34 can include a shaft member 56. The shaft member 56 can pass through the first piercing hole 52 and the second piercing hole 54 to engage the first engaging portion 48 with the adjacent second engaging portion 50. In the embodiment, the width of the first engaging portion 48 can be preferably smaller than the width of the second engaging portion 50, so that the first lateral member 40 and the second lateral member 42 can be rotated in the first direction D1 and shifted in the second direction D2.

As shown in FIG. 7, each of the first lateral member 40 and the second lateral member 42 can have a hook portion 58, and the display screen 12 can have an opening portion 60 accordingly. A structural height of the first lateral member 40 (and/or the second lateral member 42) can be equal to a structural height of the display screen 12, and thus position of the hook portion 58 can correspond to position of the opening portion 60; when the first lateral member 40 (and/or the second lateral member 42) is assembled with the display screen 12 by hooking the hook portion 58 into the opening portion 60, the upper side and the lower side of the first lateral member 40 (and/or the second lateral member 42) can align with the upper side and the lower side of the display screen 12, so as to prevent the shelter 24 from over-protruding the first display 16 and the second display 18 for preferred appearance of the sheltering apparatus 10.

The hook portion 58 of the first lateral member 40 (and/or the second lateral member 42) can be a downwardly stretching structure. When the hook portion 58 is downwardly inserted into the opening portion 60, the shelter 24 can be stably assembled with the display screen 12 via a gravity of the first lateral member 40 (and/or the second lateral member 42). If each of the first lateral member 40 and the second lateral member 42 has the opening portion and the display screen 12 has the related hook portion (which are not shown in the figures), the hook portion of the display screen 12 can be an upwardly stretching structure; therefore, when the opening portion of the first lateral member 40 (and/or the second lateral member 42) is used to downwardly assemble with the hook portion of the display screen 12, the shelter 24 can be stably assembled with the display screen 12 via the gravity of the first lateral member 40 (and/or the second lateral member 42).

As shown in FIG. 8, the first top member 36 and the first lateral member 40 (which may be replaced by the second top member 38 and the second lateral member 42) can respectively include a first fixing portion 62 and a second fixing portion 64. A shape of the first fixing portion 62 can be a pillar structure or a L-type structure, which is disposed on an edge of the first top member 36 adjacent to the first lateral member 40 (or an edge of the second top member 38 adjacent to the second lateral member 42). A shape of the second fixing portion 64 can be a one-way hole or a crooked hole, which is disposed on an edge of the first lateral member 40 adjacent to the first top member 36 (or an edge of the second lateral member 42 adjacent to the second top member 38). One set of the first fixing portion 62 and the second fixing portion 64 can be respectively designed as the L-type structure and the crooked hole, which are used to constrain a movement of the first top member 36 relative to the first lateral member 40 (or a movement of the second top member 38 relative to the second lateral member 42) in several directions, such as constraint in a vertical direction and in a horizontal direction. The other set of the first fixing portion 62 and the second fixing portion 64 can be respectively designed as the pillar structure and the one-way hole, which are used to constrain the movement of the first top member 36 relative to the first lateral member 40 (or the movement of the second top member 38 relative to the second lateral member 42) in one direction, such as constraint in the horizontal direction; the set of the pillar structure and the one-way hole can be auxiliary design.

As shown in FIG. 9, the first lateral member 40 may optionally include a first light shading portion 66, which is disposed on an outer surface of the first lateral member 40 facing toward the second lateral member 42; the second lateral member 42 may optionally include a second light shading portion 68, which is disposed on an outer surface of the second lateral member 42 facing toward the first lateral member 40. The first lateral member 40 can be assembled with the second lateral member 42 in the rotatable and shiftable manner via connection of the first engaging portion 48 and the second engaging portion 50, and an interval may be formed between the first engaging portion 48 and the second engaging portion 50 to prevent the first engaging portion 48 from being interfered with the second engaging portion 50 in rotation; therefore, the first light shading portion 66 and the second light shading portion 68 can be set on a light transmission path to block environmental illumination from outside of the first lateral member 40 and the second lateral member 42, so as to avoid the image quality of the display screen 12 from being affected by the environmental illumination.

For increasing light shading efficiency of the first light shading portion 66 and the second light shading portion 68, the first light shading portion 66 can be preferably close to the first engaging portion 48, and the height of the first light shading portion 66 can be equal to or smaller than the height of the first engaging portion 48; the second light shading portion 68 can be preferably close to the second engaging portion 50, and the height of the second light shading portion 68 can be equal to or smaller than the height of the second engaging portion 50. If the height of the first light shading portion 66 is greater than the height of the first engaging portion 48 (or the height of the second light shading portion 68 is greater than the height of the second engaging portion 50), the first lateral member 40 may be structurally interfered with the second lateral member 42 when the shelter 24 is folded, so that a size of the first light shading portion 66 should be equal to or smaller than a size of the first engaging portion 48 (or a size of the second light shading portion 68 should be equal to or smaller than a size of the second engaging portion 50), and the first light shading portion 66 can be partly overlapped with the second light shading portion 68 to shelter the environmental illumination from the outside of the first lateral member 40 and the second lateral member 42.

As shown in FIG. 9, the first top member 36 may dispose a first contacting portion 70 on an outer edge of the first top member 36 adjacent to the second top member 38, and the second top member 38 may dispose a second contacting portion 72 on an outer edge of the second top member 38 adjacent to the first top member 36. The first contacting portion 70 and the second contacting portion 72 can block the environmental illumination from passing through the interval between the first engaging portion 48 and the second engaging portion 50, so that the first contacting portion 70 can be close to the first engaging portion 48 of the first lateral member 40, and the second contacting portion 72 can be close to the second engaging portion 50 of the second lateral member 42. Generally, the first contacting portion 70 may be the protruding structure and the second contacting portion 72 may be the sunken structure; if the first top member 36 is moved relative to the second top member 38, the first contacting portion 70 (such as the protruding structure) can be partly overlapped with the second contacting portion 72 (such as the sunken structure), for sheltering the environmental illumination from the outside of the first lateral member 40 and the second lateral member 42.

Besides, the first contacting portion 70 may be designed as the sunken structure, and the second contacting portion 72 may be designed as the related protruding structure; or both the first contacting portion 70 and the second contacting portion 72 may be designed as the protruding structures. Shapes, dimensions and connection between the first contacting portion 70 and the second contacting portion 72 are not limited to the above-mentioned embodiments, which depends on the design demand. Any structures capable of partly overlapping the first contacting portion 70 with the second contacting portion 72 can belong to a design scope of the present invention.

In conclusion, the shelter, the sheltering device and the sheltering apparatus of the present invention can utilize the first top member and the second top member to respectively shelter parts of the upper side of the two adjacent displays, and then connect the bridging component between the first top member and the second top member. The bridging component can have the first lateral member and the second lateral member freely assembled with each other in the rotatable manner, and the first lateral member and the second lateral member are respectively connected to the first top member and the second top member, so that the first lateral member and the second lateral member of the bridging component can be automatically unfolded or folded when the assembly angle between the two adjacent displays of the display screen is varied; the rotation angle between the two lateral members can be immediately and synchronously changed in accordance with variation of the assembly angle between the two adjacent displays. The shelter of the present invention can be matched with the multi-display assembly having the plural displays number included at any assembly angle, so that the sheltering device and the sheltering apparatus can be easily changed the assembly angle between the displays in response to the user's demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shelter of adjusting an assembly angle applied for a display screen with a first display and a second display, the shelter comprising:
    a bridging component, comprising:
        a first lateral member detachably connected to the first display; and
        a second lateral member rotatably assembled with the first lateral member and detachably connected to the second display;
    a first top member disposed on an upper end of the first lateral member; and
    a second top member disposed on an upper end of the second lateral member, and partly overlapped with the first top member for matching relative rotation between the first lateral member and the second lateral member.

2. The shelter of claim 1, wherein the second top member is a stage-type structure having a first region and a second region, the second top member is overlapped with the first top member via the first region, and the second region aligns with the first top member.

3. The shelter of claim 1, wherein the first lateral member comprises at least one first engaging portion, the second lateral member comprises at least one second engaging portion, the first engaging portion is movably engaged with the second engaging portion to allow the relative rotation between the first lateral member and the second lateral member.

4. The shelter of claim 3, wherein when the first engaging portion is engaged with the second engaging portion, the first engaging portion is spaced from the second engaging portion in a predefined distance, so that the first lateral member is able to rotate and shift relative to the second lateral member.

5. The shelter of claim 3, wherein the first engaging portion comprises a pin, the second engaging portion comprises an axle hole, the pin is rotatably inserted into the axle hole to engage the first engaging portion with the second engaging portion.

6. The shelter of claim 3, wherein the first engaging portion comprises a first piercing hole, the second engaging portion comprises a second piercing hole, the bridging component further comprises a shaft member, the shaft member passes through the first piercing hole and the second piercing hole to engage the first engaging portion with the second engaging portion.

7. The shelter of claim 3, wherein the first lateral member further comprises a first light shading portion disposed on an outer surface of the first lateral member facing toward the second lateral member, the first light shading portion is adjacent to the first engaging portion, and a height of the first light shading portion is equal to or smaller than a height of the first engaging portion.

8. The shelter of claim 7, wherein the second lateral member further comprises a second light shading portion disposed on an outer surface of the second lateral member facing toward the first lateral member, the second light shading portion is adjacent to the second engaging portion, and a height of the second light shading portion is equal to or smaller than a height of the second engaging portion.

9. The shelter of claim 3, wherein the first top member comprises a first contacting portion disposed on an outer edge of the first top member, and further adjacent to the first engaging portion of the first lateral member.

10. A sheltering apparatus of adjusting an assembly angle, comprising:
 a first display;
 a first masking component disposed on a side of the first display;
 a second display;
 a second masking component disposed on a side of the second display opposite to the first display; and
 a shelter disposed between the first display and the second display, the shelter comprising:
  a bridging component, comprising:
   a first lateral member detachably connected to the first display; and
   a second lateral member rotatably assembled with the first lateral member and detachably connected to the second display;
  a first top member disposed on an upper end of the first lateral member and connected to the first masking component; and
  a second top member disposed on an upper end of the second lateral member and connected to the second masking component, the second top member being partly overlapped with the first top member for matching relative rotation between the first lateral member and the second lateral member.

11. The sheltering apparatus of claim 10, wherein the first masking component comprises a lateral masking area and an upper masking area, the upper masking area is disposed between the lateral masking area and the first top member of the shelter.

12. The sheltering apparatus of claim 10, wherein the second top member is a stage-type structure having a first region and a second region, the second top member is overlapped with the first top member via the first region, and the second region aligns with the first top member.

13. The sheltering apparatus of claim 10, wherein the first lateral member comprises at least one first engaging portion, the second lateral member comprises at least one second engaging portion, the first engaging portion is movably engaged with the second engaging portion to allow the relative rotation between the first lateral member and the second lateral member.

14. The sheltering apparatus of claim 13, wherein when the first engaging portion is engaged with the second engaging portion, the first engaging portion is spaced from the second engaging portion in a predefined distance, so that the first lateral member is able to rotate and shift relative to the second lateral member.

15. The sheltering apparatus of claim 13, wherein the first engaging portion comprises a pin, the second engaging portion comprises an axle hole, the pin is rotatably inserted into the axle hole to engage the first engaging portion with the second engaging portion.

16. The sheltering apparatus of claim 13, wherein the first engaging portion comprises a first piercing hole, the second engaging portion comprises a second piercing hole, the bridging component further comprises a shaft member, the shaft member passes through the first piercing hole and the second piercing hole to engage the first engaging portion with the second engaging portion.

17. The sheltering apparatus of claim 13, wherein the first lateral member further comprises a first light shading portion disposed on an outer surface of the first lateral member facing toward the second lateral member, the first light shading portion is adjacent to the first engaging portion, and a height of the first light shading portion is equal to or smaller than a height of the first engaging portion.

18. The sheltering apparatus of claim 17, wherein the second lateral member further comprises a second light shading portion disposed on an outer surface of the second lateral member facing toward the first lateral member, the second light shading portion is adjacent to the second engaging portion, and a height of the second light shading portion is equal to or smaller than a height of the second engaging portion.

19. The sheltering apparatus of claim 13, wherein the first top member comprises a first contacting portion disposed on an outer edge of the first top member, and further adjacent to the first engaging portion of the first lateral member.

* * * * *